(12) United States Patent
Yoo et al.

(10) Patent No.: US 9,136,953 B2
(45) Date of Patent: Sep. 15, 2015

(54) INTERFERENCE ESTIMATION FOR WIRELESS COMMUNICATION

(75) Inventors: Taesang Yoo, San Diego, CA (US); Tao Luo, San Diego, CA (US); Yongbin Wei, San Diego, CA (US); Siddhartha Mallik, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 166 days.

(21) Appl. No.: 13/196,711

(22) Filed: Aug. 2, 2011

(65) Prior Publication Data
US 2012/0201152 A1 Aug. 9, 2012

Related U.S. Application Data

(60) Provisional application No. 61/370,400, filed on Aug. 3, 2010, provisional application No. 61/480,288, filed on Apr. 28, 2011.

(51) Int. Cl.
*H04B 17/345* (2015.01)

(52) U.S. Cl.
CPC ................... *H04B 17/345* (2015.01)

(58) Field of Classification Search
USPC ......................................................... 370/252
See application file for complete search history.

(56) References Cited

U.S. PATENT DOCUMENTS

| | | | | |
|---|---|---|---|---|
| 5,936,979 A * | 8/1999 | Jyrkka | ........................ | 714/763 |
| 6,574,456 B2 | 6/2003 | Hamabe | | |
| 6,839,333 B1 | 1/2005 | Åkerberg | | |
| 6,907,270 B1 * | 6/2005 | Blanz | ........................ | 455/562.1 |
| 6,973,098 B1 | 12/2005 | Lundby et al. | | |
| 7,031,753 B2 | 4/2006 | Hashem et al. | | |
| 7,184,497 B2 * | 2/2007 | Jeske et al. | ..................... | 375/346 |
| 7,283,510 B2 * | 10/2007 | Ito et al. | ........................ | 370/346 |
| 7,428,269 B2 | 9/2008 | Sampath et al. | | |
| 7,738,907 B2 | 6/2010 | Xiao et al. | | |

(Continued)

FOREIGN PATENT DOCUMENTS

| | | |
|---|---|---|
| CN | 1438781 A | 8/2003 |
| CN | 1708923 A | 12/2005 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 9)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V9.3.0, Sep. 17, 2010, pp. 1-80, XP050442094, [retrieved on Sep. 17, 2010].

(Continued)

*Primary Examiner* — Ian N Moore
*Assistant Examiner* — Lakeram Jangbahadur
(74) *Attorney, Agent, or Firm* — Seyfarth Shaw LLP

(57) ABSTRACT

Interference on pilot signals and on data tones can be mismatched. Different types of interference estimates perform differently based on how the mismatch occurs. The resulting interference estimate may thus be inaccurate. Interference estimates based on pilot signals and also on data tones can both be evaluated for reliability. The more reliable of the two can then be selected. If the data tones estimate is selected, the estimate can be calculated from covariance matrices or from traffic-to-pilot ratios.

28 Claims, 11 Drawing Sheets

(56) References Cited

U.S. PATENT DOCUMENTS

| | | | |
|---|---|---|---|
| 7,742,444 B2 | 6/2010 | Mese et al. | |
| 7,813,311 B2* | 10/2010 | Dick et al. | 370/324 |
| 7,852,744 B2* | 12/2010 | Palanki | 370/204 |
| 7,860,198 B2* | 12/2010 | Montalbano | 375/346 |
| 7,907,572 B2 | 3/2011 | Yang et al. | |
| 7,944,983 B2 | 5/2011 | Fu et al. | |
| 8,068,785 B2 | 11/2011 | Ahn et al. | |
| 8,073,481 B2* | 12/2011 | Luo et al. | 455/522 |
| 8,085,875 B2 | 12/2011 | Gore et al. | |
| 8,102,935 B2* | 1/2012 | Akkarakaran et al. | 375/267 |
| 8,107,885 B2 | 1/2012 | Love et al. | |
| 8,121,602 B2 | 2/2012 | Yi et al. | |
| 8,130,849 B2* | 3/2012 | Lincoln et al. | 375/260 |
| 8,229,036 B2* | 7/2012 | Kolze | 375/340 |
| 8,254,911 B1 | 8/2012 | Lee | |
| 8,270,547 B2* | 9/2012 | Panicker et al. | 375/346 |
| 8,275,408 B2 | 9/2012 | Attar et al. | |
| 8,305,921 B2* | 11/2012 | Narasimhan et al. | 370/252 |
| 8,306,165 B2* | 11/2012 | Huang et al. | 375/346 |
| 8,385,477 B2 | 2/2013 | Cedergren et al. | |
| 8,477,603 B2 | 7/2013 | Sambhwani et al. | |
| 8,493,942 B2 | 7/2013 | Luo et al. | |
| 8,605,771 B2 | 12/2013 | Cairns | |
| 8,611,295 B2 | 12/2013 | Song et al. | |
| 8,654,701 B2 | 2/2014 | Kazmi et al. | |
| 2001/0007819 A1 | 7/2001 | Kubota | |
| 2002/0188723 A1 | 12/2002 | Choi et al. | |
| 2003/0016740 A1 | 1/2003 | Jeske et al. | |
| 2003/0125040 A1 | 7/2003 | Walton et al. | |
| 2004/0072579 A1* | 4/2004 | Hottinen | 455/456.1 |
| 2006/0121946 A1 | 6/2006 | Walton et al. | |
| 2007/0036179 A1 | 2/2007 | Palanki et al. | |
| 2007/0064655 A1 | 3/2007 | Ruuska | |
| 2007/0081480 A1 | 4/2007 | Cai et al. | |
| 2007/0098098 A1 | 5/2007 | Xiao et al. | |
| 2007/0109989 A1* | 5/2007 | Nakagawa et al. | 370/328 |
| 2007/0191015 A1 | 8/2007 | Hwang et al. | |
| 2007/0197251 A1* | 8/2007 | Das et al. | 455/522 |
| 2007/0232238 A1 | 10/2007 | Kawasaki | |
| 2007/0293234 A1 | 12/2007 | Kim et al. | |
| 2008/0014958 A1 | 1/2008 | Kim et al. | |
| 2008/0051087 A1 | 2/2008 | Ryu et al. | |
| 2008/0123547 A1 | 5/2008 | Palanki | |
| 2008/0233967 A1 | 9/2008 | Montojo et al. | |
| 2008/0261645 A1 | 10/2008 | Luo et al. | |
| 2009/0135754 A1* | 5/2009 | Yavuz et al. | 370/311 |
| 2009/0161781 A1 | 6/2009 | Kolze | |
| 2009/0170442 A1 | 7/2009 | Asanuma et al. | |
| 2009/0199055 A1 | 8/2009 | Chen et al. | |
| 2009/0201825 A1 | 8/2009 | Shen et al. | |
| 2009/0238256 A1 | 9/2009 | Onggosanusi et al. | |
| 2009/0247181 A1 | 10/2009 | Palanki et al. | |
| 2009/0252077 A1 | 10/2009 | Khandekar et al. | |
| 2009/0257390 A1 | 10/2009 | Ji et al. | |
| 2009/0286497 A1 | 11/2009 | Akkarakaran et al. | |
| 2009/0316809 A1 | 12/2009 | Chun et al. | |
| 2009/0323616 A1 | 12/2009 | Zeller et al. | |
| 2010/0002664 A1 | 1/2010 | Pan et al. | |
| 2010/0008282 A1 | 1/2010 | Bhattad et al. | |
| 2010/0035555 A1 | 2/2010 | Bala et al. | |
| 2010/0039970 A1 | 2/2010 | Papasakellariou et al. | |
| 2010/0041390 A1 | 2/2010 | Chen et al. | |
| 2010/0048151 A1 | 2/2010 | Hara | |
| 2010/0067366 A1* | 3/2010 | Nicoli | 370/210 |
| 2010/0098012 A1 | 4/2010 | Bala et al. | |
| 2010/0106828 A1 | 4/2010 | Palanki et al. | |
| 2010/0111235 A1* | 5/2010 | Zeng et al. | 375/343 |
| 2010/0182903 A1 | 7/2010 | Palanki et al. | |
| 2010/0195582 A1 | 8/2010 | Koskinen | |
| 2010/0195604 A1 | 8/2010 | Papasakellariou et al. | |
| 2010/0202311 A1 | 8/2010 | Lunttila et al. | |
| 2010/0202372 A1 | 8/2010 | Chun et al. | |
| 2010/0214937 A1* | 8/2010 | Chen et al. | 370/252 |
| 2010/0215075 A1 | 8/2010 | Jonsson et al. | |
| 2010/0216405 A1 | 8/2010 | Bhadra et al. | |
| 2010/0222062 A1 | 9/2010 | Chou et al. | |
| 2010/0226327 A1 | 9/2010 | Zhang et al. | |
| 2010/0227638 A1 | 9/2010 | Park et al. | |
| 2010/0272077 A1 | 10/2010 | Van Rensburg et al. | |
| 2010/0278109 A1 | 11/2010 | Papasakellariou et al. | |
| 2010/0278290 A1 | 11/2010 | Huang et al. | |
| 2011/0013710 A1 | 1/2011 | Xiao | |
| 2011/0032839 A1 | 2/2011 | Chen et al. | |
| 2011/0081917 A1 | 4/2011 | Frank et al. | |
| 2011/0092231 A1* | 4/2011 | Yoo et al. | 455/501 |
| 2011/0105164 A1 | 5/2011 | Lim et al. | |
| 2011/0105171 A1 | 5/2011 | Luschi et al. | |
| 2011/0142003 A1* | 6/2011 | Kuchi et al. | 370/330 |
| 2011/0158211 A1* | 6/2011 | Gaal et al. | 370/338 |
| 2011/0170514 A1 | 7/2011 | Eriksson et al. | |
| 2011/0177821 A1 | 7/2011 | Senarath et al. | |
| 2011/0206167 A1 | 8/2011 | Rosenqvist et al. | |
| 2011/0211503 A1 | 9/2011 | Che et al. | |
| 2011/0249643 A1 | 10/2011 | Barbieri et al. | |
| 2011/0250919 A1 | 10/2011 | Barbieri et al. | |
| 2011/0275394 A1 | 11/2011 | Song et al. | |
| 2011/0312319 A1 | 12/2011 | Lindoff et al. | |
| 2011/0312358 A1* | 12/2011 | Barbieri et al. | 455/507 |
| 2011/0317624 A1 | 12/2011 | Luo et al. | |
| 2012/0003945 A1 | 1/2012 | Liu et al. | |
| 2012/0009959 A1 | 1/2012 | Yamada et al. | |
| 2012/0044818 A1 | 2/2012 | Lindoff et al. | |
| 2012/0063386 A1 | 3/2012 | Park et al. | |
| 2012/0076025 A1 | 3/2012 | Barbieri et al. | |
| 2012/0076040 A1* | 3/2012 | Hoshino et al. | 370/252 |
| 2012/0082197 A1* | 4/2012 | Jonsson et al. | 375/224 |
| 2012/0092989 A1 | 4/2012 | Baldemair et al. | |
| 2012/0113851 A1 | 5/2012 | Schober et al. | |
| 2012/0190391 A1 | 7/2012 | Yoo et al. | |
| 2012/0201152 A1* | 8/2012 | Yoo et al. | 370/252 |
| 2012/0263247 A1* | 10/2012 | Bhattad et al. | 375/260 |
| 2012/0327795 A1 | 12/2012 | Mallik et al. | |
| 2012/0329498 A1* | 12/2012 | Koo et al. | 455/501 |
| 2013/0039203 A1 | 2/2013 | Fong et al. | |
| 2013/0157675 A1* | 6/2013 | Li et al. | 455/452.1 |
| 2013/0301458 A1 | 11/2013 | Barbieri et al. | |
| 2014/0348019 A1 | 11/2014 | Barbieri et al. | |

FOREIGN PATENT DOCUMENTS

| | | | |
|---|---|---|---|
| CN | 1943158 A | 4/2007 | |
| EP | 1337054 A2 | 8/2003 | |
| EP | 1735938 A1 | 12/2006 | |
| JP | 2007189619 A | 7/2007 | |
| JP | 3973017 B2 | 9/2007 | |
| JP | 2010016494 A | 1/2010 | |
| JP | 2013534778 A | 9/2013 | |
| KR | 20080046404 A | 5/2008 | |
| RU | 2211535 C2 | 8/2003 | |
| RU | 2351069 C2 | 3/2009 | |
| WO | 03041300 A1 | 5/2003 | |
| WO | 2005089004 A1 | 9/2005 | |
| WO | 2005099163 A1 | 10/2005 | |
| WO | 2006020021 A1 | 2/2006 | |
| WO | 2006099546 A1 | 9/2006 | |
| WO | 2007016553 A1 | 2/2007 | |
| WO | WO2008082118 A1 | 7/2008 | |
| WO | 2008118810 A1 | 10/2008 | |
| WO | 2009023730 A2 | 2/2009 | |
| WO | 2009057960 A2 | 5/2009 | |
| WO | 2009065075 A1 | 5/2009 | |
| WO | 2009099811 A1 | 8/2009 | |
| WO | 2009119988 A1 | 10/2009 | |
| WO | 2009120465 A2 | 10/2009 | |
| WO | 2009120934 A1 | 10/2009 | |
| WO | WO2009118707 A1 | 10/2009 | |
| WO | WO2010002230 A2 | 1/2010 | |
| WO | 2010025270 A1 | 3/2010 | |
| WO | 2010056763 A1 | 5/2010 | |
| WO | 2010058979 A2 | 5/2010 | |
| WO | 2010083451 A2 | 7/2010 | |
| WO | WO2010074444 A2 | 7/2010 | |
| WO | WO2010089408 A1 | 8/2010 | |
| WO | 2010103886 A1 | 9/2010 | |

(56) References Cited

FOREIGN PATENT DOCUMENTS

| WO | WO2011002389 A1 | 1/2011 |
|---|---|---|
| WO | 2011130447 A1 | 10/2011 |
| WO | 2011163265 A1 | 12/2011 |
| WO | 2011163482 A1 | 12/2011 |
| WO | WO2012018894 A1 | 2/2012 |

OTHER PUBLICATIONS

International Search Report and Written Opinion—PCT/US2011/053424—ISA/EPO—Feb. 29, 2012.
Philips: "CQI/PMI reference measurement periods", 3GPP Draft; R1-082528, 3rd Generation Partnership Project (3GPP), Mobile Competence Centre ; 650, Route Des Lucioles ; F-06921 Sophia-Antipolis Cedex ; France, vol. RAN WGI, No. Warsaw, Poland; 20080625, Jun. 25, 2008, XP050110793, [retrieved on Jun. 25, 2008].
Catt: "Considerations on Interference Coordination in Het-Net", 3GPP Draft; R1-100902, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; 20100222, Feb. 16, 2010, XP050418504, [retrieved on Feb. 16, 2010].
CMCC: "Discussion on HeNB related interference scenarios and deployment configurations" , 3GPP Draft; R4-091232, 3rd Generation Partnership Project (3GPP), Mobile Competence Centre ; 650, Route Des Lucioles ; F-06921 Sophia-Antipolis Cedex ; France, No. Seoul, Korea; 20090330, Mar. 30, 2009, XP050342009, [retrieved on Mar. 30, 2009] the whole document.
Duplicy, J. et al. (Mar. 8, 2011) "MU-MIMO in LTE Systems," EURASIP Journal on Wireless Communications and Networking, Hindawi Publishing Corporation, vol. 2011, Article ID 496763, pp. 1-13, doi: 10.1155/2011/496763.
Huawei: "Correction on CQI reporting", 3GPP Draft; R1-091652 36.213 CR238(REL-8,F) Correction on CQI Reporting, 3rd Generation Partnership Project (3GPP), Mobile Competence Centre ; 650, Route Des Lucioles ; F-06921 Sophia-Antipolis Cedex ; France, No. Seoul, Korea; 20090328, Mar. 28, 2009, XP050339187, [retrieved on Mar. 28, 2009].
Huawei: "CQI Enhancement for Interference Varying Environments", 3GPP Draft; R1-101061 CQI Enhancement for Interference Varying Environments VER (Final), 3rd Generation Partnership Project (3GPP), Mobile Competence Centre ; 650, Route Des Lucioles ; F-06921 Sophia-Antipolis Cedex ; France, vol. RAN WGI, No. San Francisco, USA; 20100222, Feb. 16, 2010, XP050418632, [retrieved on Feb. 16, 2010].
Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, No. Beijing, china; 20100412, Apr. 6, 2010, XP050419318, [retrieved on Apr. 6, 2010].
International Search Report and Written Opinion—PCT/US2011/046391—ISA/EPO—Oct. 27, 2011.

NTT DOCOMO: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, No. Beijing, china; 20100412, Apr. 7, 2010, XP050419698, [retrieved on Apr. 7, 2010].
Sawahashi M., et al., "Coordinated multi point transmission/reception techniques for LTE-advanced [Coordinated and Distributed MIMO]" IEEE Wireless Communications, IEEE Service Center, Piscataway, NJ, US, vol. 17, No. 3, Jun. 1, 2010, pp. 26-34, XP011311805, ISSN: 1536-1284 p. 30, paragraph Uplink.
Hsieh M-H. et al: "Channel Estimation for OFDM Systems Based on Comb-Type Pilot Arrangement in Frequency Selective Fading Channels", IEEE Transactions on Consumer Electronics, vol. 44, No. 1, Feb. 1998, pp. 217-225.
Catt: "Analysis of Time-Partitioning Solution for Control Channel", 3GPP TSG RAN WG1 meeting #61bis, R1-103494, Dresden, Germany, Jun. 28-Jul. 2, 2010, pp. 1-3.
Huawei: "Enhanced ICIC and Resource-Specific CQI Measurement", 3GPP TSG RAN WG1 meeting #61bis, R1-103900, Dresden, Germany, Jun. 28-Jul. 2, 2010, pp. 1-6.
Intel Corporation (UK) Ltd, "Non-CA based PDCCH Interference Mitigation in LTE-A", 3GPP TSG RAN WG1 Meeting #61 R1-102814 Montreal, Canada, May 10-14, 2010.
Khandekar A., "LTE-Advanced: Heterogeneous networks", Wireless Conference (EW), 2010 European, Apr. 12-15, 2010, pp. 978-982.
LG Electronics, "Extending Rel-8/9 ICIC for heterogeneous network", 3GPP TSG RAN WG1 Meeting #60bis, R1-102430, Apr. 12-16, 2010, 4 pages.
Nishio A, et al., "Adaptive Transmission Techniques for Control Signaling in 3G-LTE," Panasonic Technical Journal, vol. 55, No. 1, Apr. 2009, pp. 15-20.
Qualcomm Incorporated: "Data channel ICIC and the benefits of possible extensions", 3GPP Draft; R1-103562 Data Channel ICIC and the Benefits of Possible Extensions, 3rd Generation Partnership Project (3GPP), Mobile Competence Centre; 650, Route Des Lucioles; F-06921 Sophia-Anti Polis Cedex; France, vol. RAN WG1, no. Dresden, Germany; Jun. 28, 2010, Jun. 28-Jul. 2, 2010 (Jun. 22, 2010), XP050449060, pp. 1-5.
Qualcomm Incorporated, "Enabling communication in harsh interference scenarios", 3GPP TSG-RAN WG1 #62bis R1-105693 Oct. 11-15, 2010 Xian, China.
Research in Motion et al: "On Downlink Single Cell MU-MIMO in LTE-A", 3GPP Draft; R1-094458(RIM-Downlink Single Cell MU-MIMO in LTE-A), 3rd Generation Partnership Project (3GPP), Mobile Competence Centre; 650, Route Des Lucioles; F-06921 Sophia-Antipolis Cedex; France, no. Jeju; Nov. 9, 2009, XP050388884, [retrieved on Nov. 3, 2009] p. 3.
Research in Motion, UK Limited, "On Downlink Single Cell MU-MIMO in LTE-A", 3GPP TSG RAN WG1 Meeting #59bis R1-100562, Valencia, Spain, Jan. 18-22, 2010.
Samsung: Static/Dynamic Home eNB ICIC function, 3GPP TSG RAN WG1 #61bis R1-103683, Jun. 24, 2010.

\* cited by examiner

INTERFERENCE ESTIMATION FOR WIRELESS COMMUNICATION

CROSS-REFERENCE TO RELATED APPLICATION

This application claims the benefit under 35 U.S.C. §119 (e) to U.S. Provisional Patent Application No. 61/370,400, filed on Aug. 3, 2010, in the names of YOO et al., and U.S. Provisional Patent Application No. 61/480,288, filed on Apr. 28, 2011, in the names of MALLIK et al., the disclosures of which are expressly incorporated by reference herein in their entireties.

BACKGROUND

1. Field

Aspects of the present disclosure relate generally to wireless communication systems, and more particularly to estimating interference in wireless communication systems.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Interference on pilot signals and on data tones can be mismatched. Different types of interference estimates perform differently based on how the mismatch occurs. The resulting interference estimate may thus be inaccurate. Interference estimates based on pilot signals and also on data tones can both be evaluated for reliability. The more reliable of the two can then be selected. If the data tones estimate is selected, the estimate can be calculated from covariance matrices or from traffic-to-pilot ratios.

According to an aspect of the present disclosure, a method of wireless communication in a wireless network includes computing a first interference estimate based on common reference signal tones. The method also includes computing a second interference estimate based on data tones. The method further includes selecting the data tones interference estimate or the common reference signal tones interference estimate based on a reliability determination of the first interference estimate and the second interference estimate.

In another aspect, an apparatus for wireless communication includes means for computing a first interference estimate based on common reference signal tones. The apparatus also has means for computing a second interference estimate based on data tones. the apparatus also has means for selecting the data tones interference estimate or the common reference signal tones interference estimate based on a reliability determination of the first interference estimate and the second interference estimate.

In still another aspect, a computer program product for wireless communications has a non-transitory computer-readable medium having program code recorded thereon. The program code includes program code to compute a first interference estimate based on common reference signal tones; and program code to compute a second interference estimate based on data tones. The program code also includes program code to select the data tones interference estimate or the common reference signal tones interference estimate based on a reliability determination of the first interference estimate and the second interference estimate.

In a further aspect, an apparatus for wireless communications has a memory, and at least one processor coupled to the memory. The processor(s) is configured to compute a first interference estimate based on common reference signal tones. The processor(s) is also configured to compute a second interference estimate based on data tones. The processor (s) is further configured to select the data tones interference estimate and the common reference signal tones interference estimate based on a reliability determination of the first interference estimate and the second interference estimate.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
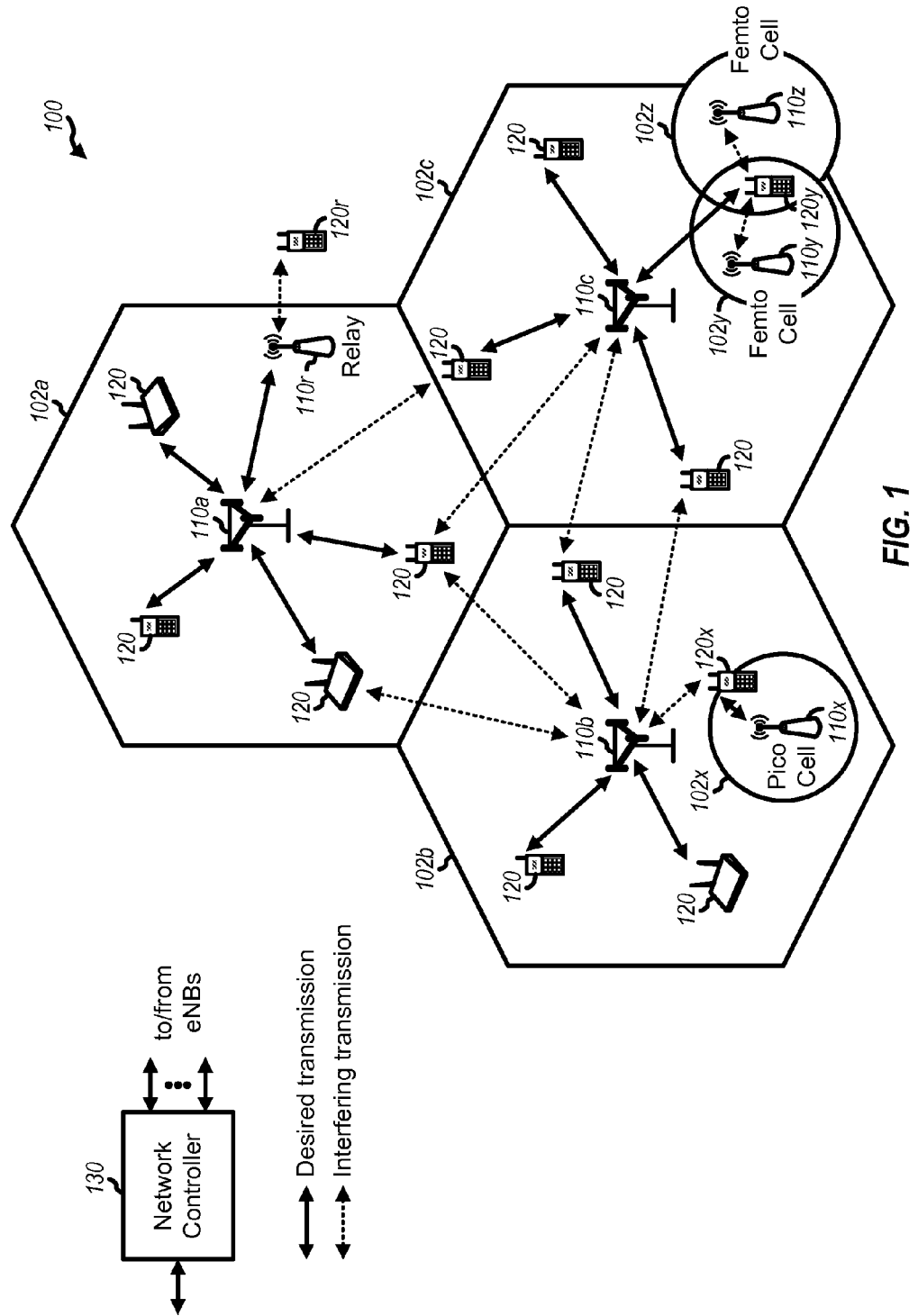
FIG. 1 is a block diagram conceptually illustrating an example of a telecommunications system.

FIG. 1 shows a wireless communication network 100, which may be an LTE-A network, in which estimating interference using reference signal tones, data tones, and a traffic-to-power ratio may be implemented. The wireless network 100 includes a number of evolved nodeBs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

Figure 2:
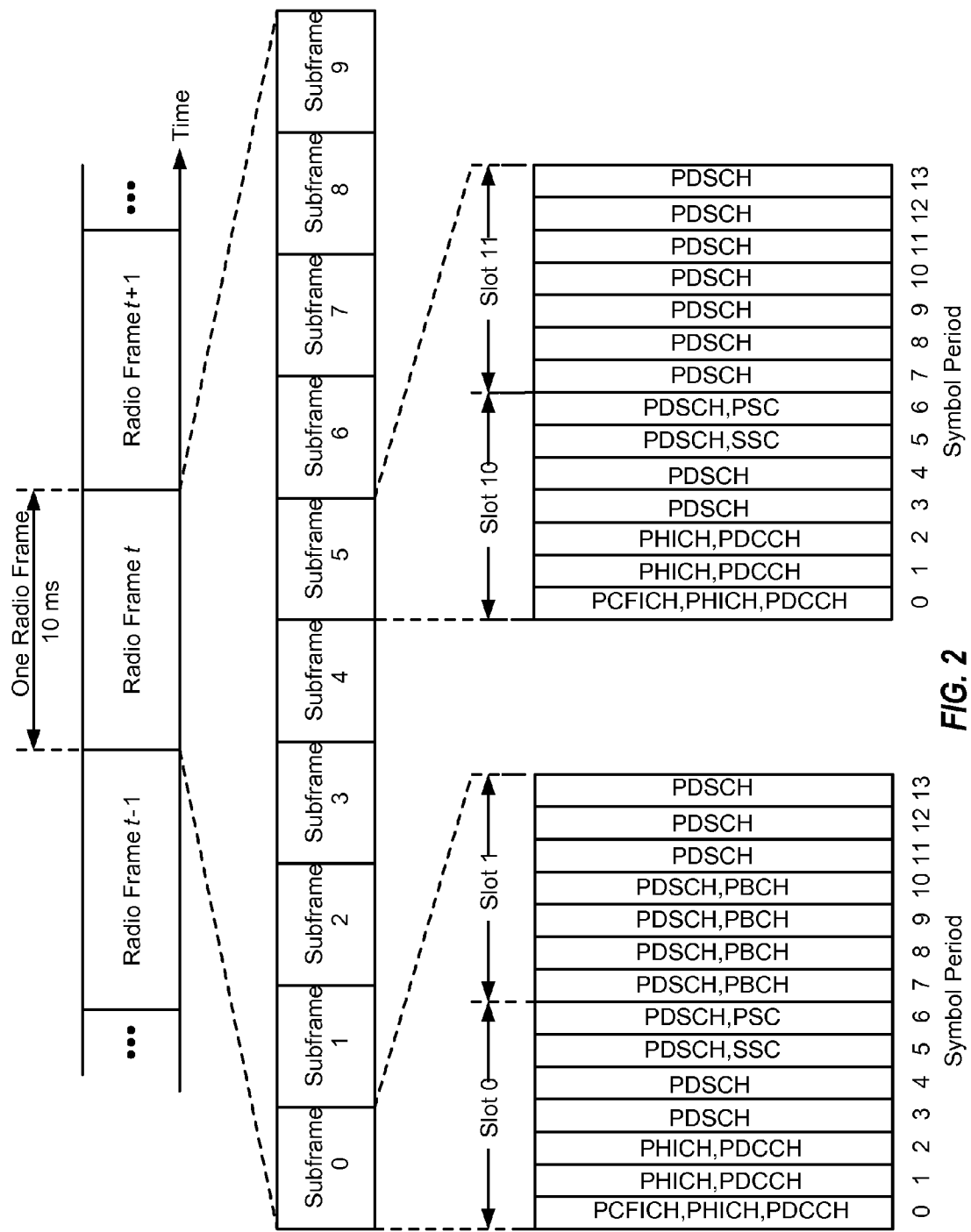
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 4:
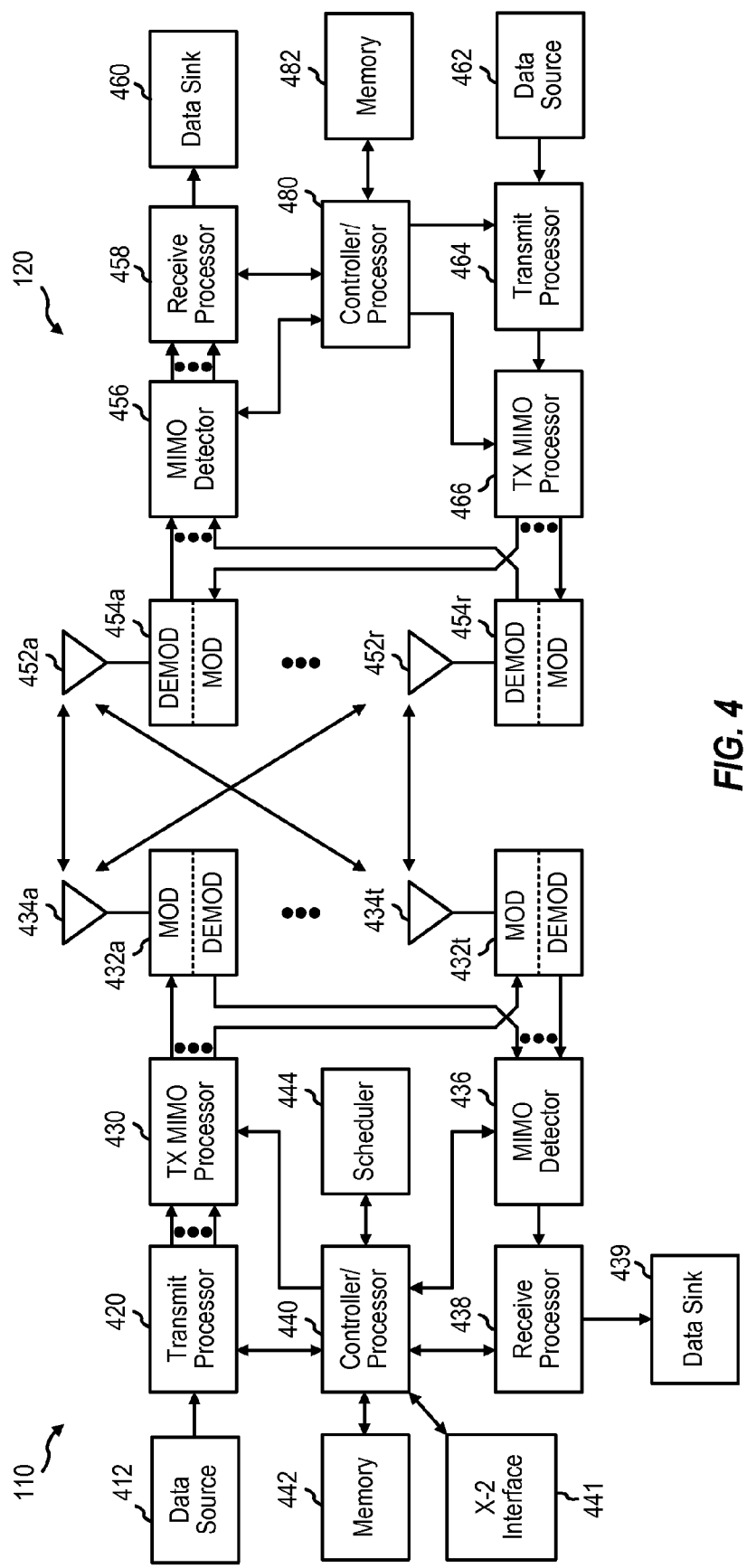
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use FIGS. 6A, 6B, 7, 8 and 10, and/or other processes for the techniques described herein. The memories 442 and 482 may store data and program codes for the base station 110 and the UE 120, respectively. A scheduler 444 may schedule UEs for data transmission on the downlink and/or uplink.

Heterogeneous Networks

Wireless networks may have eNBs of different power classes. For example, three power classes may be defined, in decreasing power class, as macro eNBs, pico eNBs, and femto eNBs. Networks featuring such different power class eNBs may be referred to as heterogeneous networks. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Referring back to FIG. 1, the heterogeneous wireless network 100 uses the diverse set of eNBs 110 (i.e., macro eNBs, pico eNBs, femto eNBs, and relays) to improve the spectral efficiency of the system per unit area. The macro eNBs 110a-c are usually carefully planned and placed by the provider of the wireless network 100. The macro eNBs 110a-c generally transmit at high power levels (e.g., 5 W-40 W). The pico eNB 110x and the relay 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

Range Extension

If server selection is based predominantly on downlink received signal strength, as provided in the LTE Release 8 standard, the usefulness of mixed eNB deployment of heterogeneous networks, such as the wireless network 100, will be greatly diminished. This is because the larger coverage area of the higher powered macro eNBs, such as the macro eNBs 110*a-c*, limits the benefits of splitting the cell coverage with the pico eNBs, such as the pico eNB 110*x*, because, the higher downlink received signal strength of the macro eNBs 110*a-c* will attract all of the available UEs, while the pico eNB 110*x* may not be serving any UE because of its much weaker downlink transmission power. Moreover, the macro eNBs 110*a-c* will likely not have sufficient resources to efficiently serve those UEs. Therefore, the wireless network 100 will attempt to actively balance the load between the macro eNBs 110*a-c* and the pico eNB 110*x* by expanding the coverage area of the pico eNB 110*x*. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network provides a fixed partitioning of resources equally between the macro eNBs 110*a-c* and the pico eNB 110*x*. However, even with this active balancing of load, downlink interference from the macro eNBs 110*a-c* should be mitigated for the UEs served by the pico eNBs, such as the pico eNB 110*x*. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110*x*, in the presence of the stronger downlink signals transmitted from the higher-powered eNBs, such as the macro eNBs 110*a-c*, the pico eNB 110*x* engages in control channel and data channel interference coordination with the dominant interfering ones of the macro eNBs 110*a-c*. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

Adaptive Resource Partitioning

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Resource partitioning information allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Figure 5:
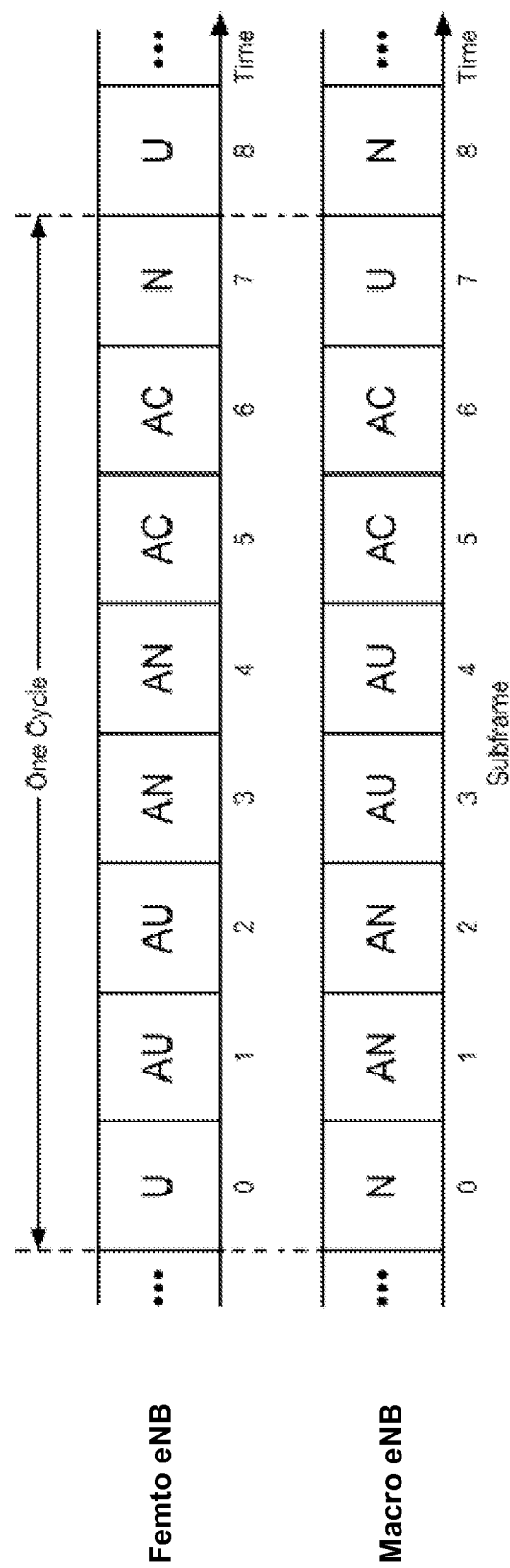
FIG. 5 is a block diagram conceptually illustrating adaptive resource partitioning in a heterogeneous network according to one aspect of the disclosure.

FIG. 5 is a block diagram illustrating TDM partitioning, a type of resource partitioning, in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). The dynamically assigned subframes (AU/AN/AC) are referred to herein collectively as 'X' subframes. During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for cell range extension (CRE) area (also referred to as extended boundary area (EBA)) UEs strongly affected by aggressor eNodeBs. A CRE area UE may belong to a first eNodeB but also be located in the coverage area of a second eNodeB. For example, a UE communicating with a macro eNodeB that is near the range limit of a femto eNodeB coverage is an CRE area UE.

Interference Estimation

In order for a UE to demodulate and decode received data, it may perform interference estimation to determine the reliability of desired symbols received from the serving cell. In particular, when a UE is in a location where it receives a signal from multiple cells, the ability for the UE to accurately estimate interference is desirable. As illustrated in FIG. 1, a UE such as the UE 120x may desire to receive a signal from the eNB 110b and may perform interference analysis to estimate interference caused by the pico cell 110x. One method of interference analysis is for the UE to estimate interference based on reference signal tones, such as common reference signal tones, to account for interference caused by neighboring cells. Broadcast common reference signal tones may be measured and used to estimate interference on a channel so that the interference on the channel can be cancelled. Common reference signal interference cancellation may be used for decoding downlink control and data channels (e.g., PDCCH/PDSCH). This enables more accurate Radio Resource Management measurements.

Common reference signal interference cancellation may sometimes provide inaccurate interference estimates because interfering cells transmit common reference signal pilot tones whether or not the cells are transmitting data. The interference estimates are generally based on interference detected on the common reference signal pilot tones. However, in some situations, the interference estimates based on pilot tones could be quite different from interference that is actually present. For example, a UE that detects the pilot tone may estimate interference based upon an assumption that the interferer is transmitting data even when no data tones are actually being transmitted from the interferer. This incorrect assumption may cause the UE to overestimate the interference and have a negative impact on link performance.

Partial loading and/or resource partitioning in a heterogeneous network may also create mismatches between interference estimates based on a common reference signal pilot tones of an interfering signal and actual interference from data transmissions of the interferer. For example, a mismatch can occur if a cell ID combination of the serving cell and interfering cell result in a collision between common reference signal tones of the interferer and common reference signal tones of the serving cell, in situations when the UE has no information on whether the interferer is transmitting data, particularly with regard to the 'X' subframes discussed with respect to FIG. 5. In such situations, the interference estimate based on common reference signal tones may be different from the actual interference seen on data tones because the estimate would be accounting for interference which did not exist on data tones. This mismatch may impact link performance.

Differences between estimated interference and actual interference could have a large impact on communication link performance. Link performance conditions, such as throughput and frame error rate, for example, may be improved if the interference condition on data tones is known to the UE.

One approach to informing a UE of interference conditions on data tones involves signalling of neighbor cell loading status. However, even with such additional signalling, this approach may not provide enough information to a UE when the interferer is partially loaded.

Another solution to this mismatch is to use UE-specific reference signals (UE-RSs) for interference estimation. This solution, however, is limited to certain unicast data channels, such as physical downlink shared channels (PDSCHs) that contain UE-RSs. The solution is not appropriate with data channels that do not contain UE-RSs, nor with the Physical Control Format Indicator Channel (PCFICH), Physical HARQ Indicator Channel (PHICH), or Physical Downlink Control Channel (PDCCH).

An interference estimate based on reference signal tones, such as common reference signal (CRS) tones, offers good performance across a wide range of signal to noise ratios (SNRs), particularly in a full loading scenario (where all nearby cells are actively transmitting data). The interference estimate, however, may suffer from mismatch problems described above. An interference estimate based on data tones avoids the mismatch problem but may suffer from poor estimation accuracy at high SNRs.

Figure 6A:
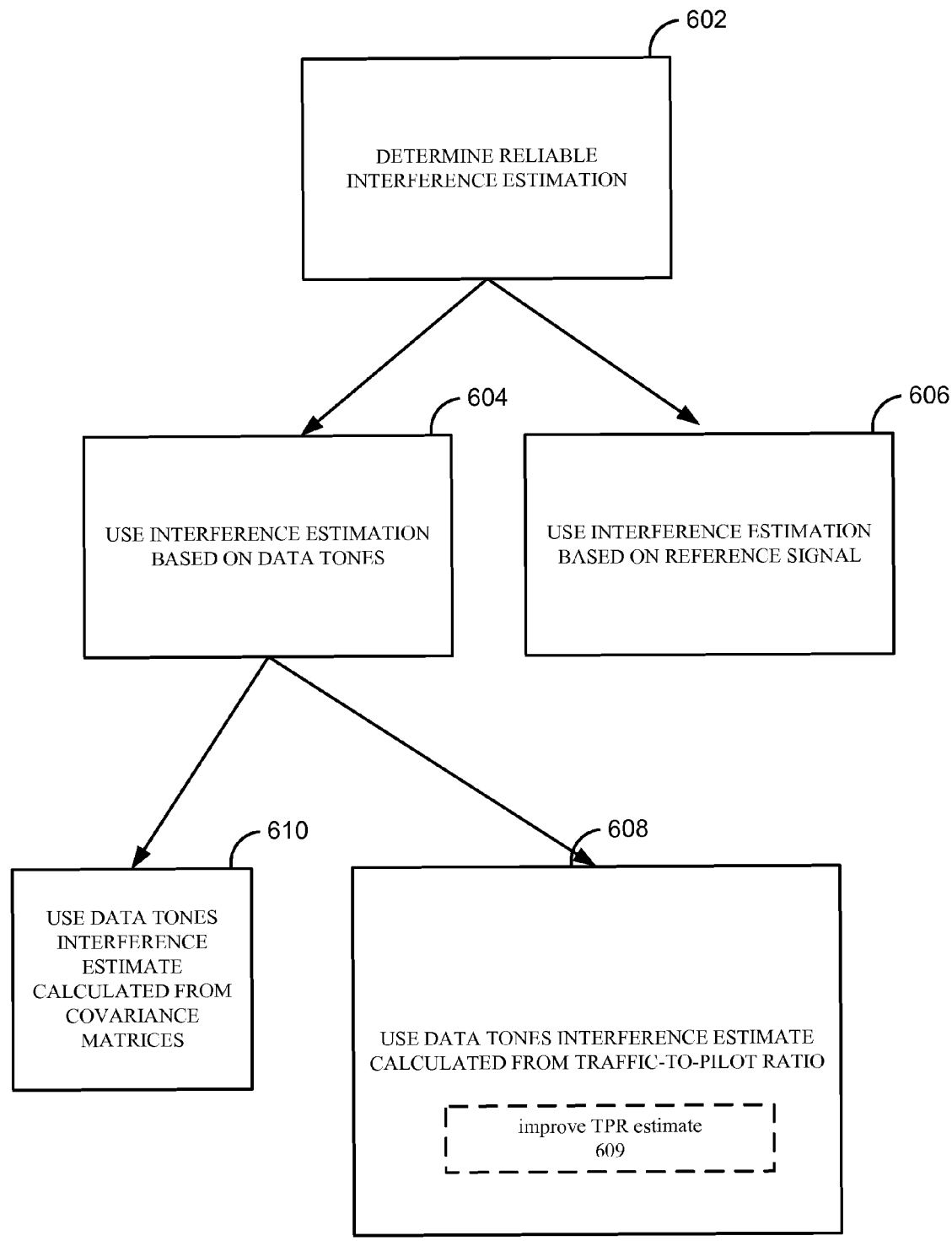
FIG. 6A is a block diagram illustrating a method for estimating interference in accordance with one aspect of the present disclosure.

FIG. 6A illustrates interference estimation according to aspects of the present disclosure. First, a UE determines which interference estimation to use based on a reliability determination, shown in block 602. If interference estimation based on a reference signal is determined to be reliable, as shown in block 606, it is used. If interference estimation based on data tones is determined to be reliable, as shown in block 604, a method is chosen to calculate the data tones interference estimate. The data tones interference estimate may be calculated from a traffic-to-pilot ratio, as shown in block 608. The TPR estimate may optionally be improved in block 609, as described in more detail below. The data tones interference estimate may be calculated from the covariance matrices, as discussed above and shown in block 610. As the covariance solution is more complex, when overall processing resources are a limiting factor, the TRP solution should be selected. The data tones interference estimate may also be calculated using other methods.

Figure 3:
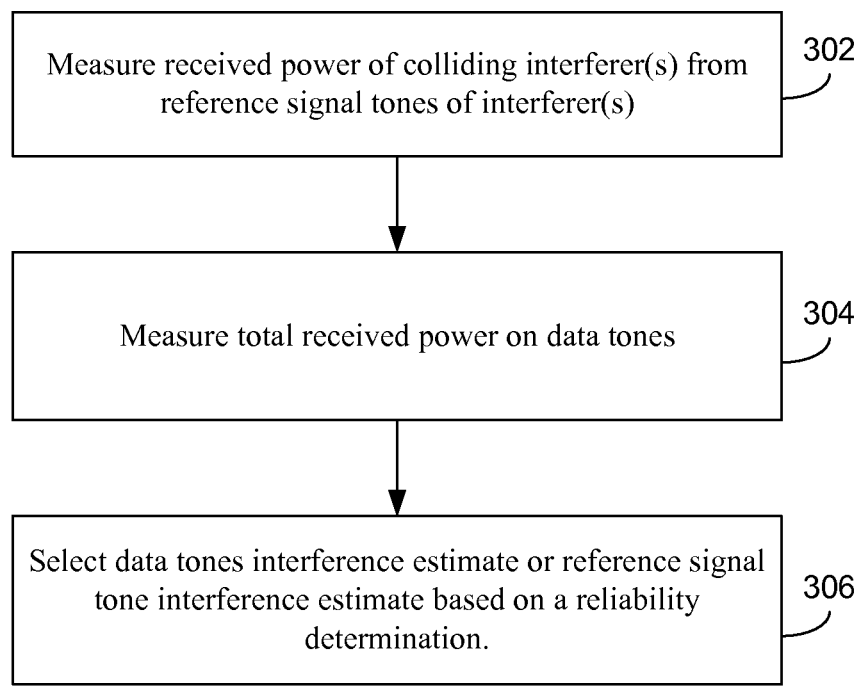
FIG. 3 is a block diagram illustrating a method for selecting a type of interference estimate according to one aspect of the present disclosure.

In one aspect of the present disclosure, reliability of the interference estimate is decided, as seen in FIG. 3. In this aspect, a UE measures received power of colliding interferers from the reference signal tones of the interferer at block 302. The UE may also measure the total received power on the data tones [as explained in more detail below] at block 304. Based on these power measurements the UE decides whether a data tone based interference estimate will be reliable at block 306. If the UE selects the data tones approach, then the UE can determine reliability as described below. If the UE uses the TPR approach to estimate interference, the UE observes whether the dominant colliding interferer is some amount (e.g., 10 dB) weaker than the serving cell. If so, then the data tone based interference is not reliable. Of course other rules can be employed to determine reliability, and these examples are non-limiting.

Figure 6B:
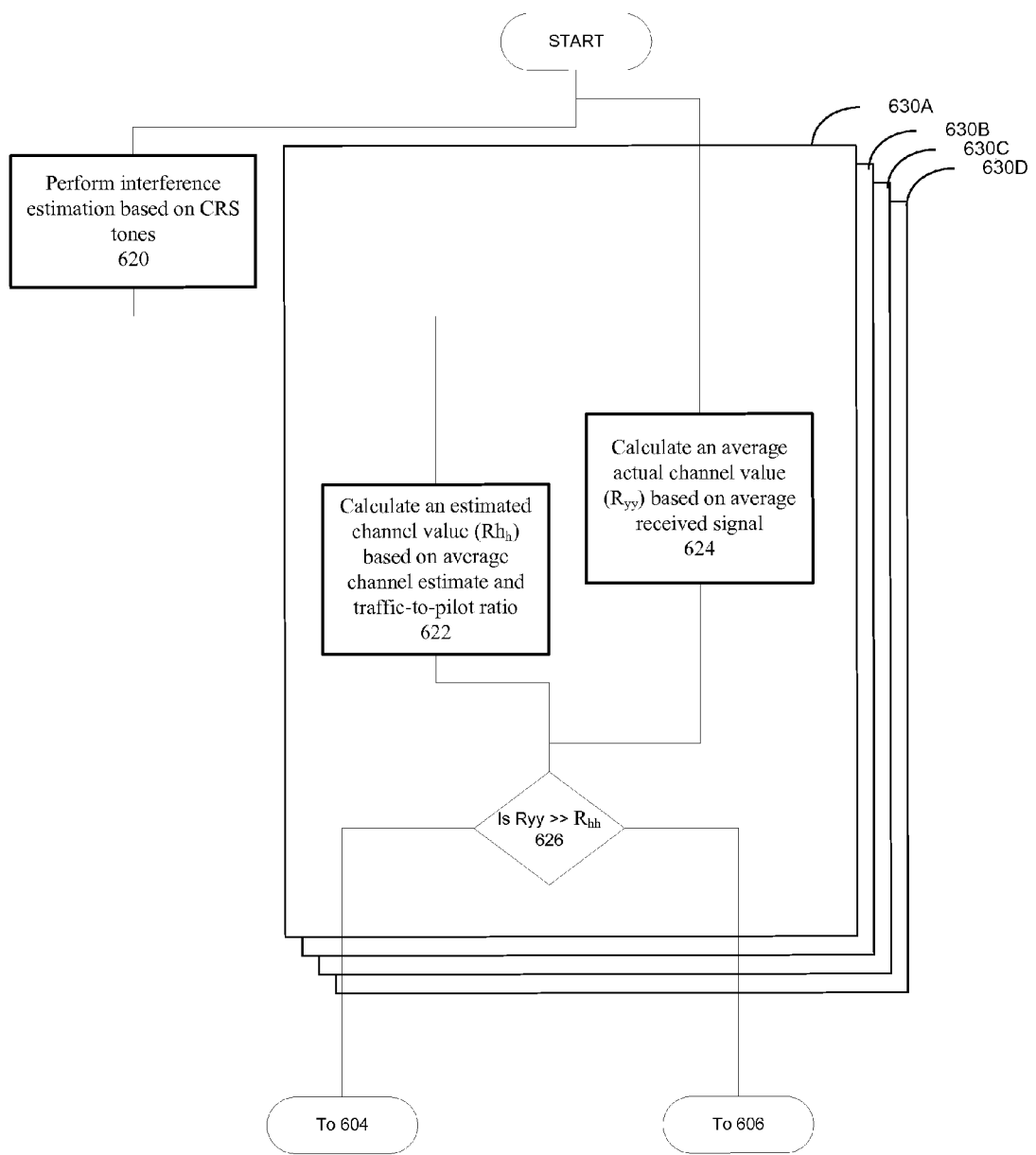
FIG. 6B is a block diagram illustrating a method for determining which interference estimate to use in accordance with one aspect of the present disclosure.

One aspect for performing the hybrid interference estimation is described below with reference to FIG. 6B. First, an interference estimate is performed based on CRS tones at block 620. Second, at block 622 a covariance matrix $R_{hh}$ is calculated according to the following formula:

$$R_{hh} = TPR \cdot E(hh^H)$$

where the expected value function (e.g., averaging) E is over a set of resource elements (REs) for which one interference estimate is calculated, TPR is the traffic-to-pilot power ratio scalar representing how much data is boosted over the pilot, h is the serving cell channel estimate, and $^H$ represents a Hermitian conjugate transposition operation, a known mathematical function for matrices.

$R_{hh}$ may be calculated in parallel with the interference estimate based on CRS tones.

At block 624, a covariance matrix of the received signal Ryy is also calculated according to the following formula:

$$R_{yy} = E(yy^H)$$

where the expected value function (e.g., averaging) E is over the same set of resource elements used above for $R_{hh}$ for which one interference estimate is calculated, y is the received signal, and $^H$ represents a Hermitian conjugate transposition operation.

$R_{yy}$ may be calculated in parallel with the interference estimate based on CRS tones and/or in parallel with $R_{hh}$.

A data tones interference estimate may then be defined by comparing Ryy and Rhh. In one aspect the following formula is used:

$$Nt\_data = R_{yy} - R_{hh}$$

where NT_data is the data tones interference estimate. Thus, if the value of a received signal minus the expected value is large, a significant amount of noise is indicated. If the value is smaller, a lower amount of noise is indicated.

At block 626 it is determined whether If $R_{yy}$ is substantially larger than $R_{hh}$. If so, then a low signal-to-noise ratio (SNR) is implied, indicating an increased amount of noise as well as a reliable interference estimation based on data tones. If $R_{yy}$ is comparable to $R_{hh}$, then a high SNR is implied, indicating a lower amount of noise as well as an unreliable interference estimation based on data tones. If the interference estimation based on data tones (Nt_data) is deemed reliable, it is used (block 604 FIG. 6A). If the interference estimation based on data tones is deemed unreliable then the interference estimation based on reference signals is used (block 606 FIG. 6A).

As $R_{yy}$ and $R_{hh}$ are both matrices, various methods may be used to determine the ordering of the matrices. In one further aspect, $R_{yy}$ may be compared with $R_{hh}$ using mathematical trace operations, i.e., $tr(R_{yy})$ and $tr(R_{hh})$, which compares the sum of the diagonal terms of the respective matrices. In this aspect, the reliability of the data tones interference estimate is based on whether $tr(R_{yy}) - tr(R_{hh})$ is greater than a certain threshold. Therefore, if $tr(R_{yy}) - tr(R_{hh})$ is greater than a certain threshold, the data tones interference estimate $Nt\_data = R_{yy} - R_{hh}$ is used.

A data tones interference estimate Nt_data may be for a specific channel 630A, 630B, 630C, 630D. That is, blocks 622, 624, and 626 can be performed for each channel. The specific channels may include a physical downlink shared channel (PDSCH), a physical hybrid automatic repeat request indicator channel (PHICH), a physical control format indicator channel (PCFICH), or a physical downlink control channel (PDCCH). In this aspect $R_{yy}$ and $R_{hh}$ are calculated for the specific channel.

According to an aspect of the present disclosure, a single data tones interference estimate Nt_data is calculated for an entire control region. The control region refers to the first few orthogonal frequency division multiplexing (OFDM) symbols allocated for PCFICH, PHICH, and PDCCH transmission in each subframe. In another aspect, a data tones interference estimate is calculated for a unit in a data region. The data region refers to the rest of the OFDM symbols allocated for PDSCH transmission in each subframe. The unit may be a resource block, multiple resource blocks, or the entire PDSCH region. In one aspect a data tones interference estimate is calculated for particular resource blocks. In this aspect, a decision between common reference signal tones interference estimation and data tones interference estimation is based on the reliability of the estimates on a resource block-by-resource block basis. In other words, a CRS tones estimate and a data tones estimate are compared for each resource block.

According to an aspect of the present disclosure, a single, separate data tones interference estimate is calculated for the resource elements occupied by the PSS, SSS, and PBCH of neighboring cells. For normal cyclic prefix (CP), these resource elements correspond to the first four OFDM symbols in the second slot of each radio frame in time, and the center six resource blocks in frequency. According to another aspect of the present disclosure, a data tones interference estimate Nt_data is calculated based on a traffic-to-pilot ratio (TPR) estimated over the data tones.

Figure 7:
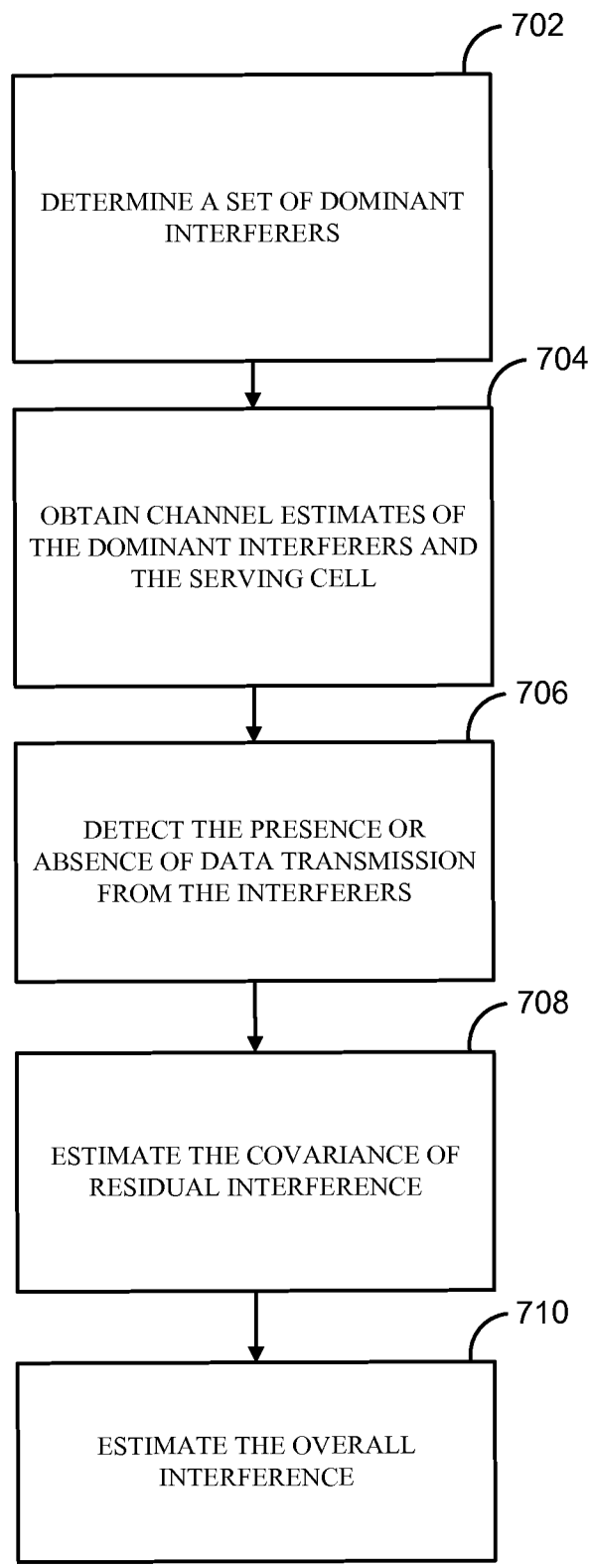
FIG. 7 is a block diagram illustrating a method for estimating interference in accordance with one aspect of the present disclosure.

Calculating a data tones interference estimate based on a traffic-to-pilot ratio (TPR) estimated over the data tones is described with reference to FIG. 7. A UE may estimate the interference by taking into account the fact that certain interferers are not transmitting data. According to this aspect, a UE may attempt to determine whether interferers with detected pilot tones are presently transmitting data. For this determination, the UE compares the total power on the data tones with the power the UE sees on the pilot tones from the interferers. This aspect includes determining a set of dominant interferers with pilot tones colliding with pilot tones of the serving cell in block 702 and obtaining channel estimates of these dominant interferers and the serving cell in block 704.

In block 706, the presence or absence of data transmission from interferers is detected using the total received power on data tones and the norm of the channel estimates of the serving cell and dominant interferers. Alternatively, the UE may use the received power on candidate demodulation resource symbol (DM-RS)/UE-RS sequences of dominant interferers to detect the presence or absence of data transmissions from interferers. More generally the traffic-to-pilot ratio (TPR) of the interferers is estimated.

The TPR represents a ratio of powers at which the transmitted data (traffic) is divided by the power at which the pilot tones are transmitted. For example, a TPR of 0 indicates a pilot tone with no corresponding data transmission. A TPR of 1 indicates data is transmitted with the same power as the pilot tone. A TPR, which is a scalar quantity, may be estimated for individual interferers or collectively for a set of interferers.

In block 708, the covariance of the residual interference seen on the pilot tones is estimated. This estimate of the residual interference seen on pilot tones excludes the interference from the dominant colliding interferers having channels that were already estimated. In block 710, the overall interference covariance matrix is estimated as a function of the residual interference, the (scalar) TPR estimates of interferers, and covariance of the channel estimates of the dominant interferers. Here, the overall interference matrix is the sum of two parts. The first part represents the residual interference. The second part represents a scaled version of the covariance of the channel estimate of the dominant interferers. The scaling is determined by the TPR estimate of the interferer.

The methods to estimate interference according to aspects of the present disclosure provide several advantages over current techniques. For example, aspects of the present disclosure correctly estimate interference in partial loading scenarios in which an interferer does not send data on all resource blocks in a subframe. In such situations the UE may perform a resource block-by-resource block estimate to generate a more accurate estimate, for example. Aspects of the present disclosure may also correctly estimate interference in a heterogeneous network scenario on 'X' subframes. Also, in situations such as a heterogeneous network when a UE may not be aware of whether an interferer is sending data, the UE may detect the presence of an interferer and may still be able to generate a correct interference estimate.

Figure 8:
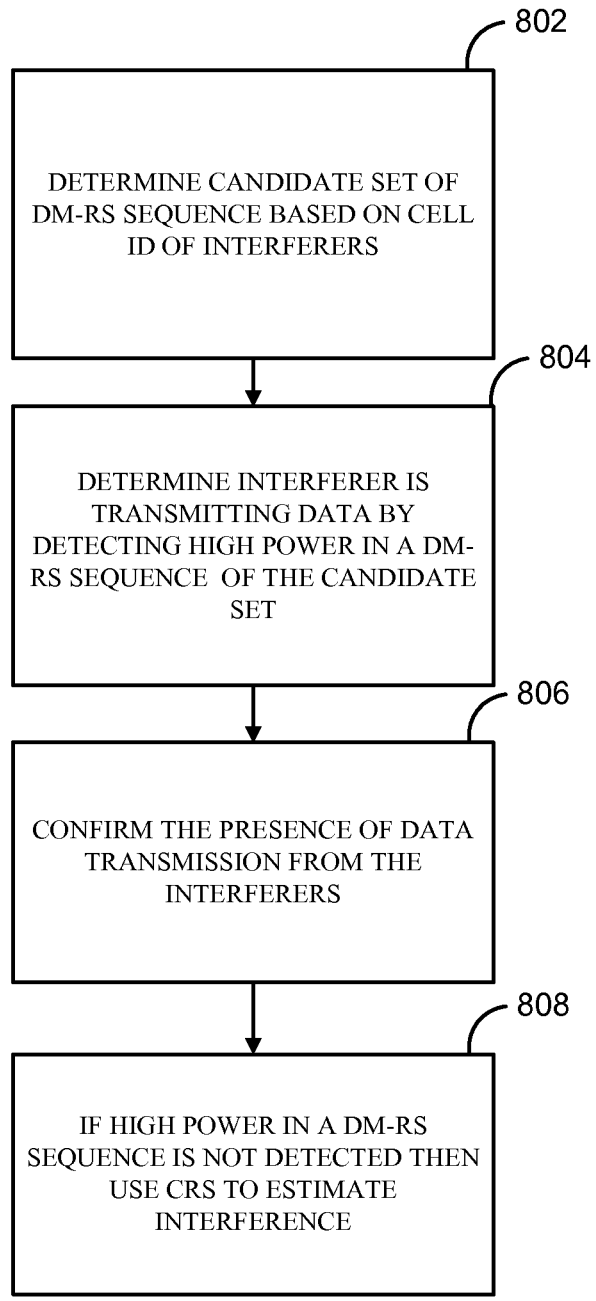
FIG. 8 is a block diagram illustrating a method for estimating interference in accordance with one aspect of the present disclosure.

An alternative method of detecting the presence or absence of data transmissions from interferers (block 706, FIG. 7) using DM-RS transmissions of dominant interferers is described in more detail with reference to FIG. 8. According to standards, DM-RS has a fixed location and its scrambling code is a function of a cell ID and a scrambling code identifier.

A demodulation resource symbol (DM-RS) is utilized to determine whether there is data transmission from an interfering cell A DM-RS is transmitted by an interferer only if the interferer is sending data. Further, a candidate set of DM-RS sequences is known to the UE because the set of DM-RS sequences that may be transmitted by the interferer is a function of the cell ID of the interferer. Therefore, in block 802, a UE may follow multiple hypotheses as to whether a particular interferer is presently transmitting data and whether the interferer is using a particular DM-RS sequence. In block 804, if the UE detects a large amount of energy on any of the DM-RS sequences that fits its hypothesis, then the UE can assume the DM-RS sequences belong to a particular interferer presently transmitting data in block 806.

Detection of a DM-RS sequence of an interferer confirms that there is data transmission on the interferer. However, an interferer may still be transmitting data without utilizing a DM-RS sequence. Therefore, a lack of detected DM-RS sequence does not confirm the interferer is silent. According to aspects of the present disclosure, if a DM-RS sequence is not detected, then the UE may detect the interferer with common reference signal transmissions of the interferer and estimate the TPR of the interferer in block 808. Interferers with a TPR estimated via DM-RS, need not be considered for TPR estimation via common reference signals. TPR estimates based upon DM-RS may improve TPR estimates based upon common reference signal transmissions of interferers.

Aspects of the present disclosure provide numerous techniques for estimating a TPR when the TPR of multiple interferers are to be estimated using total received power on data tones and the power of common reference signal transmissions of the interferers. According to one aspect of the present disclosure, a single TPR value which applies for all the interferers may be estimated. This technique may be suboptimal in some circumstances but works well in other circumstances, such as when a single interferer dominates.

According to another aspect of the present disclosure, interferers may be partitioned such that interferers with similar spatial interference structure are in the same partition. In this case, a single TPR for each partition may be estimated. According to another aspect of the present disclosure, iterative approaches may be also be used. For example, initially it may be assumed that all interferers have an initial TPR estimate of 1 (or 0, or a fraction between 0 and 1). Then, the TPR of one interferer may be iteratively estimated assuming the other TPRs are exactly known. In other words, when multiple interferers are presently transmitting data, a UE may first assume that the weaker interferers are present. The UE may then only try to estimate the TPR of the stronger interferers. Based on the estimate of the stronger interferers, the UE may decide to perform further iterations to estimate the TPR of progressively weaker interferers, and thereby test the initial assumption that particular weaker interferers are present.

Certain aspects of the disclosure may provide improved granularity of the TPR estimate, i.e., the number of TPR estimates computed on a given subframe. In one example, one TPR estimate may be computed for each resource block (RB), the minimum unit of resource allocation to a UE. In one aspect, the granularity may be varied so that one TPR estimate can be computed over multiple resource blocks. This may be beneficial if it is known that interference does not vary too much across resource blocks, for example. In another example, two TPR estimates may be computed for each resource block. In still another example, one single TPR estimate may be computed for the two resource blocks in a subframe. This may be beneficial for subframes carrying relay backhaul traffic from a donor eNB, as the first and second slots within the same subframe can have different characteristics. Similarly, within a resource block, a different TPR estimate may be generated for every tone or set of tones (e.g., resource element group (REG)), for example.

According to another aspect of the present disclosure, the quality of the TPR estimate may be further improved by quantization (609 FIG. 6). It is generally known with a high probability that a TPR estimate should fall within a certain range. For example, the TPR is known to be a non-negative real number which is generally between the values of 0.5 and 2 (i.e., −6 dB to 3 dB).

According to an aspect of the present disclosure, a quantization rule is designed to leverage the above observations. Because of the known range, quantization rules may be implemented to change TPR estimates that fall outside of a predetermined range. For example, if a TPR estimate is less than 0.1, it can be quantized to a value of zero. Similarly, if the TPR estimate is high and outside of a normal range, then it could be quantized to a more nominal value.

Figure 9:
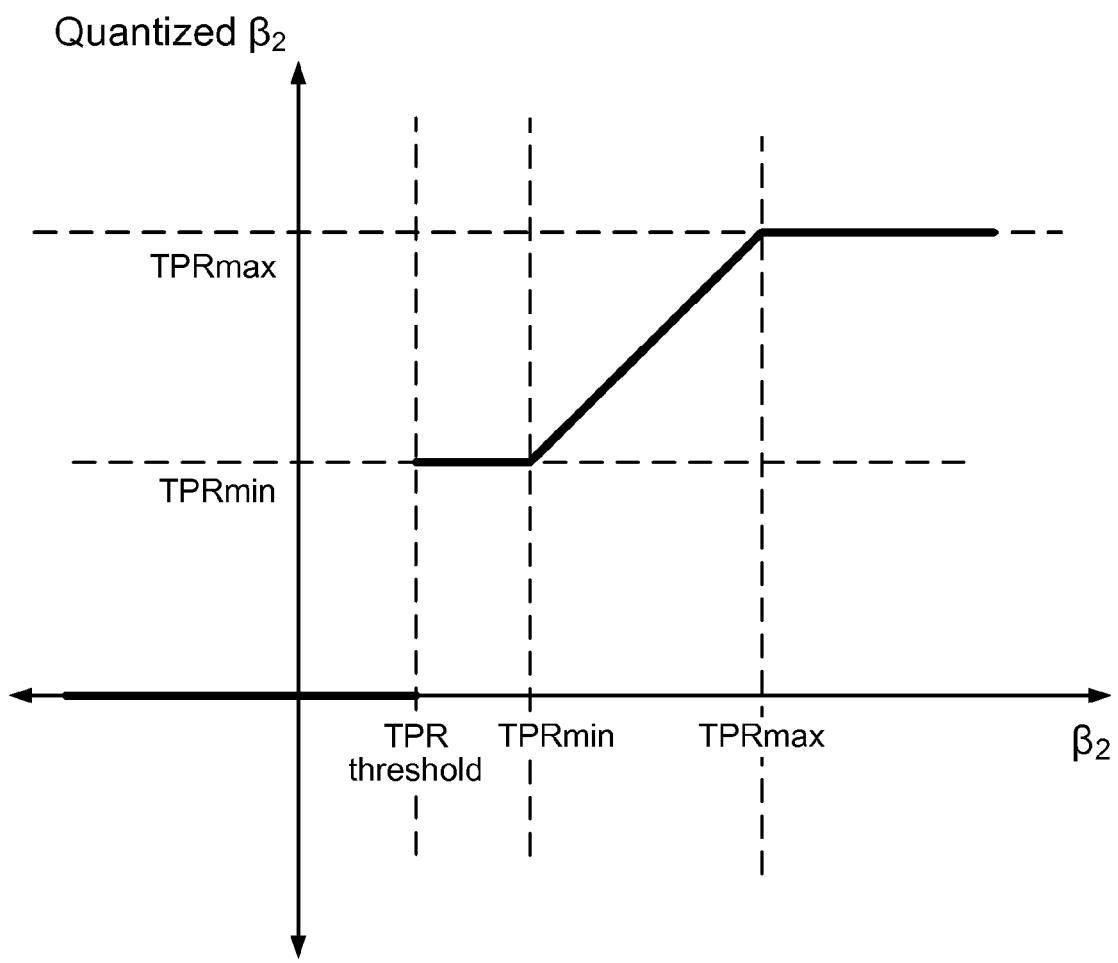
FIG. 9 is a graph conceptually illustrating quantization of a traffic to pilot ratio according to one aspect of the present disclosure.

A method of quantizing a TPR estimate according to an illustrative aspect of the present disclosure is described with reference to FIG. 9. A range of estimated TPR values which may be input to the quantization process is shown on the horizontal axis labeled '$\beta 2$'. A range of quantized TPR values that result from the quantization process are shown on the vertical axis labeled 'Quantized $\beta_2$'. Three predetermined parameters, TPRmax, TPRmin and TPR threshold are also used in the quantization process.

According to the illustrated quantization process, if the estimated TPR ($\beta 2$) is less than TPR threshold then the quantized estimate (Quantized $\beta 2$) is set to zero. If the estimated TPR ($\beta_2$) is greater than TPRmax then the quantized estimate (Quantized ($\beta_2$)) is set to TPRmax. If the estimated TPR ($\beta_2$) exceeds TPR threshold but is less than TPRmin, then the quantized estimate (Quantized $\beta_2$) is set to TPRmin. If none of these conditions are satisfied by the estimated TPR ($\beta_2$), then the estimated TPR ($\beta 2$) is left unchanged and the quantized estimate (Quantized $\beta 2$) equals the estimated TPR ($\beta_2$).

In one aspect of the present disclosure, the three predetermined parameters TPRmin, TPRmax and TPR threshold in the quantization process may be set as follows: If an interferer TPR is known then TPRmin and TPRmax are set to this known value of the interferer TPR. In this case TPR threshold may be set to 0.3 times the known interferer TPR. In an alternative aspect, these parameters may be further improved by setting them, for example, as a function of the pre-interference cancellation (IC) signal to noise ratio (SNR) of the serving cell and dominant interferer. If the serving cell TPR is unknown, then TPRmin may be set to −9 dB, TPRmax may be set to 6 dB and TPR threshold may be set to −9 dB. Of course, such values are merely exemplary and may be configured differently, when appropriate.

According to another aspect of the present disclosure, a TPR estimate may be changed to a default value of 1 if the dominant interferer is very weak compared to the serving cell. In this case, the TPR estimate is known to be unreliable so a default value of 1 can be assigned. That is, if a UE determines that a TPR estimate is not reliable because the dominant interferer is very weak, the UE nonetheless assumes that the interferer is present. This aspect of the disclosure is compatible with the behavior of existing UEs which assume that an interferer is present whenever the UEs detect the interferer's pilot tone.

According to the aspects of the present disclosure, a threshold for deciding to use the default TPR value of 1 may be based on pre-interference cancellation (pre-IC) reference signal (RS) power estimates of the serving cell and the interferer. In one example, the default TPR is used when the interferer power estimate is less than the pre-IC RS power estimate of the serving cell. In another example, the ratio of the RS power of the strongest interferer to the serving cell is computed and the default TPR estimate of 1 is forced if the computed ratio falls below a certain threshold.

In another example, the threshold for deciding to use the default TPR value of 1 may be based on quantities that are function of the post-IC reference signal channel estimates, such as wideband reference signal received power estimates. In yet another example, power estimates of more than one interferer may be used to decide whether to use the default TPR value.

Another aspect of the present disclosure provides an improved TPR estimate of an interferer by soft cancelling serving cell data (609 FIG. 6). The present disclosure includes two schemes, a symbol level scheme and a codeword level scheme, to cancel out data from a serving cell and thereby obtain a more reliable estimate of the interferer. One method of estimating an interference level is to use an equation such as:

1. $y = h_s x_s + \beta h_i x_i + n$
2. where y=signal received from the channel
3. $h_s$=serving cell signal
4. $x_s$=serving cell data
5. $h_i$=interfering cell signal
6. $x_i$=interfering cell data
7. n=noise
8. β=the estimated quantity of interference.

The above equation allows an estimate of whether β is 0 (indicating no interference present) or 1 (indicating interference is present). After determining a value of y, an estimate $\hat{h}_s \hat{x}_s$ of the serving cell may be approximate to the received channel y. That serving cell estimate may be subtracted from $\hat{y}$, an estimate of the received channel, to arrive at $\beta \hat{h}_i \hat{x}_i$, which is β times the estimate of the interfering cell received signal:

9. $y' = \hat{y} - \hat{h}_s \hat{x}_s \cong \beta \hat{h}_i \hat{x}_i + n$
10. The above equation may assist in estimating β.

The above equations may be solved on a symbol level where the calculations and estimates are on a symbol-by-symbol basis (e.g., where $x_s$ is a vector for each symbol (of n symbols) of $x = x_{s1}, x_{s2} \ldots x_{sn}$) or the equations may be solved on a codeword level, where the values represent received codewords, thus improving decoding speed.

According to the symbol level scheme, an estimate of the serving cell data is obtained by signal constellation demapping. This estimate is then subtracted out from the received data tones leading to a more accurate estimate of the interferer TPRs. If the serving cell is very strong as compared to the interferer, and if the precoding matrix used for data transmission is known, then it is possible to estimate the modulation order (i.e., 2 for QPSK, 4 for 16-QAM and 6 for 64-QAM) and also the modulation symbol used with a high degree of reliability on a per tone basis.

Soft symbol estimates that represent a weighted average of all modulation symbols in the modulation scheme may also be used in the symbol level scheme. The weights depend on the likelihood of the symbol being transmitted in a particular received signal vector.

In codeword level schemes, soft estimates of the modulation symbol used by a serving cell can be obtained from log likelihood ratios (LLRs) of the turbo decoder on a per RE (resource element) basis. Here, the UE lets the decoder run a given noise estimate. The decoder may indicate with a good probability whether certain bits are zero or one. The decoder may also indicate the symbols to which these bits are mapped.

According to this codeword level scheme, the soft estimates are subtracted out and a TPR estimate of the interferer can be computed.

Iterations between TPR estimates and soft symbol estimates may further improve performance because better TPR estimates improve the interference estimates. This, in turn, helps turbo decoding and results in a better soft symbol estimate which when subtracted leads to a better TPR estimate of the interferer.

Figure 10:
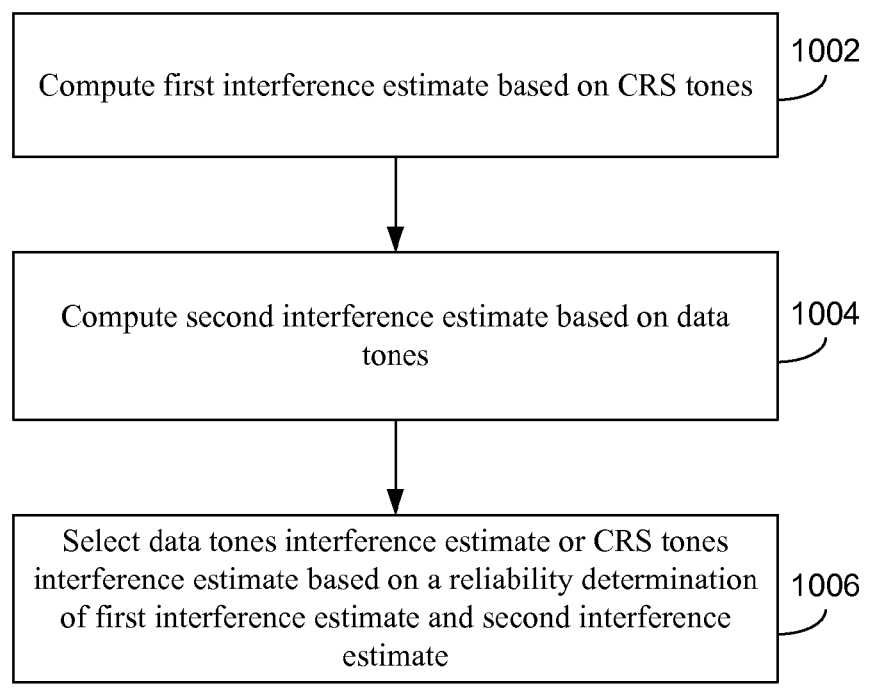
FIG. 10 is a block diagram illustrating a method for estimating interference in accordance with one aspect of the present disclosure.

FIG. 10 is a flow diagram illustrating interference estimation in a user equipment according to one aspect of the present disclosure. An apparatus, such as a UE 120 is configured to compute an interference estimate based on reference signal tones, such as common reference signal (CRS) tones, as shown in block 1002. The UE is also configured to compute an interference estimate based on data tones as shown in block 1004. The controller/processor 480, the memory 482, the receive processor 458, the demodulators 454a, and/or the antennas 452a may be configured to perform the computing.

The UE is further configured to select the data tones interference estimate or reference signal tones interference estimate based on a reliability determination as shown in block 1006. The controller/processor 480, the memory 482, the receive processor 458, the demodulators 454a, and/or the antennas 452a may be configured to perform the selecting.

In one configuration, the UE 120 configured for wireless communication includes means for selecting an interference estimate. The means may include means for computing a first interference estimate based on common reference signal tones, means for computing a second interference estimate based on data tones, and means for selecting either the data tones interference estimate or the common reference signal tones interference estimate based on a reliability determination. In one aspect, the aforementioned means may be the controller/processor 480, the memory 482, the receive processor 458, the demodulators 454a, and the antennas 452a configured to perform the functions recited by the aforementioned means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a wireless network, the method comprising:
computing a first interference estimate based on common reference signal tones;
computing a second interference estimate based on data tones by:
estimating a traffic-to-pilot ratio over data tones of colliding interferers, and
computing an interference estimate based on the traffic-to-pilot ratio;
selecting one of the first interference estimate or the second interference estimate based on a reliability determination of the first interference estimate and the second interference estimate;
performing a soft cancellation of data transmitted by a serving cell at a symbol level or at a codeword level; and
estimating the traffic-to-pilot ratio of colliding interferers after cancellation of the data transmitted by the serving cell.

2. The method of claim 1 in which computing the second interference estimate, comprises:
calculating a covariance matrix of the received signal;
calculating a covariance matrix of the serving cell channel; and
deriving the second interference estimate using the covariance matrix of the received signal and the covariance matrix of the serving cell channel.

3. The method of claim 1, in which the comparing is based on a scalar function of entries in a covariance matrix of the received signal and a covariance matrix of the serving cell channel.

4. The method of claim 1 in which the data tones comprise one or more tones from a physical downlink shared channel, a physical hybrid automatic repeat request indicator channel, a physical control format indicator channel, a physical downlink control channel, or a combination thereof.

5. The method of claim 1 in which computing the second interference estimate, comprises estimating interference from one or more of a control region, a resource block in a data region, or a combination thereof.

6. The method of claim 1, in which computing the second interference estimate is based on the at least one traffic-to-pilot ratio, channel estimates of at least one dominant interferer, and residual interference.

7. The method of claim 6, in which the residual interference comprises thermal noise and interference from other interferers excluding the at least one dominant interferer.

8. The method of claim 1, further comprising partitioning colliding interferers based on spatial signature,
and in which the estimating of the at least one traffic-to-pilot ratio comprises estimating a single traffic-to-pilot ratio for each partition.

9. The method of claim 1, in which estimating the at least one traffic-to-pilot ratio further comprises:
obtaining a channel estimate of each dominant colliding interferer and a channel estimate of a serving cell;
determining a norm of the channel estimates of each dominant interferer and the serving cell;
determining total received power on data tones of the serving cell and data tones of the dominant interferers; and
dividing the total received power of the data tones of the serving cell and data tones of the dominant interferers by the norm of channel estimates.

10. The method of claim 1, in which estimating the at least one traffic-to-pilot ratio further comprises:
determining received power of candidate de-modulation reference symbol (DM-RS) sequences of dominant interferers; and
identifying an interferer in response to detection of a de-modulation reference symbol of the interferer based on a comparison with received power of the common reference signal tones of the same interferer.

11. The method of claim 1, further comprising:
quantizing the at least one traffic-to-pilot ratio according to predetermined parameters.

12. The method of claim 1, further comprising:
changing the at least one traffic-to-pilot ratio to a default value in response to detecting an interferer power level below a predetermined threshold.

13. The method of claim 1 in which the reliability determination comprises comparing a covariance matrix of a received signal and a covariance matrix of a serving cell channel.

14. An apparatus for wireless communication, comprising:
means for computing a first interference estimate based on common reference signal tones;
means for computing a second interference estimate based on data tones by:
estimating a traffic-to-pilot ratio over data tones of colliding interferers, and
computing an interference estimate based on the traffic-to-pilot ratio;
means for selecting one of the first interference estimate or the second interference estimate based on a reliability determination of the first interference estimate and the second interference estimate;
means for performing a soft cancellation of data transmitted by a serving cell at a symbol level or at a codeword level; and
means for estimating the traffic-to-pilot ratio of colliding interferers after cancellation of the data transmitted by the serving cell.

15. A computer program product for wireless communications, the computer program product comprising:
a non-transitory computer-readable medium having program code recorded thereon, the program code comprising:
program code to compute a first interference estimate based on common reference signal tones;
program code to compute a second interference estimate based on data tones by:
estimating a traffic-to-pilot ratio over data tones of colliding interferers, and
computing an interference estimate based on the traffic-to-pilot ratio;
program code to select one of the first interference estimate or the second interference estimate based on a reliability determination of the first interference estimate and the second interference estimate;
program code to perform a soft cancellation of data transmitted by a serving cell at a symbol level or at a codeword level; and
program code to estimate the traffic-to-pilot ratio of colliding interferers after cancellation of the data transmitted by the serving cell.

16. An apparatus for wireless communications, comprising:
a memory; and
at least one processor coupled to the memory, the at least one processor being configured:
to compute a first interference estimate based on common reference signal tones;
to compute a second interference estimate based on data tones by:
estimating a traffic-to-pilot ratio over data tones of colliding interferers, and
computing an interference estimate based on the traffic-to-pilot ratio;
to select one of the first interference estimate or the second interference estimate based on a reliability determination of the first interference estimate and the second interference estimate;
to perform a soft cancellation of data transmitted by a serving cell at a symbol level or at a codeword level; and
to estimate the traffic-to-pilot ratio of colliding interferers after cancellation of the data transmitted by the serving cell.

17. The apparatus of claim 16 in which the at least one processor is further configured to compute the second interference estimate, by:
calculating a covariance matrix of the received signal;
calculating a covariance matrix of the serving cell channel; and
deriving the second interference estimate using the covariance matrix of the received signal and the covariance matrix of the serving cell channel.

18. The apparatus of claim 16, in which the at least one processor is further configured to compare based on a scalar function of entries in a covariance matrix of the received signal and a covariance matrix of the serving cell channel.

19. The apparatus of claim 16 in which the data tones comprise one or more tones from a physical downlink shared channel, a physical hybrid automatic repeat request indicator channel, a physical control format indicator channel, a physical downlink control channel, or a combination thereof.

20. The apparatus of claim 16 in which the at least one processor is further configured to compute the second interference estimate by estimating interference from one or more of a control region, a resource block in a data region, or a combination thereof.

21. The apparatus of claim 16, in which the at least one processor is further configured to compute the second interference estimate based on the at least one traffic-to-pilot ratio, channel estimates of at least one dominant interferer, and residual interference.

22. The apparatus of claim 21, in which the residual interference comprises thermal noise and interference from other interferers excluding the at least one dominant interferer.

23. The apparatus of claim 16, in which the at least one processor is further configured to partition colliding interferers based on spatial signature,
and in which the estimating of the at least one traffic-to-pilot ratio comprises estimating a single traffic-to-pilot ratio for each partition.

24. The apparatus of claim 16, in which the at least one processor is further configured to estimate the at least one traffic-to-pilot ratio by:
obtaining a channel estimate of each dominant colliding interferer and a channel estimate of a serving cell;
determining a norm of the channel estimates of each dominant interferer and the serving cell;
determining total received power on data tones of the serving cell and data tones of the dominant interferers; and
dividing the total received power of the data tones of the serving cell and data tones of the dominant interferers by the norm of channel estimates.

25. The apparatus of claim 16, in which the at least one processor is further configured to estimate the at least one traffic-to-pilot ratio by:
determining received power of candidate de-modulation reference symbol (DM-RS) sequences of dominant interferers; and identifying an interferer in response to detection of a demodulation reference symbol of the interferer based on a comparison with received power of the common reference signal tones of the same interferer.

26. The apparatus of claim 16, in which the at least one processor is further configured to quantize the at least one traffic-to-pilot ratio according to predetermined parameters.

27. The apparatus of claim 16, in which the at least one processor is further configured to change the at least one traffic-to-pilot ratio to a default value in response to detecting an interferer power level below a predetermined threshold.

28. The apparatus of claim 16 in which the reliability determination comprises comparing a covariance matrix of a received signal and a covariance matrix of a serving cell channel.

* * * * *